US005544170A

United States Patent [19]
Kasahara

[11] Patent Number: 5,544,170
[45] Date of Patent: Aug. 6, 1996

[54] ATM TRANSMISSION SYSTEM WITH A VARIABLE TRANSMISSION RATE

[75] Inventor: Hiroyuki Kasahara, Tokyo, Japan

[73] Assignee: Fujitsu Limited, Kanagawa, Japan

[21] Appl. No.: 671,068

[22] Filed: Mar. 18, 1991

[30] Foreign Application Priority Data

Mar. 16, 1990 [JP] Japan ................................ 2-065910

[51] Int. Cl.$^6$ .................................................. H04J 3/22
[52] U.S. Cl. ............................................. 370/84; 370/94.1
[58] Field of Search .............................. 370/84, 82, 83, 370/112, 102, 94.1, 60, 99, 110.1, 60.1, 94.2, 17; 340/825.02, 826; 359/135

[56] References Cited

U.S. PATENT DOCUMENTS

| | | | |
|---|---|---|---|
| 4,230,911 | 10/1980 | Fellinger et al. | 370/84 |
| 4,472,803 | 9/1984 | Iijima | 370/84 |
| 4,716,561 | 12/1987 | Angell et al. | 370/84 |
| 4,975,906 | 12/1990 | Takiyasu et al. | 370/94.1 |
| 4,993,024 | 2/1991 | Quinquis et al. | 370/84 |
| 5,029,164 | 7/1991 | Goldstein et al. | 370/95.1 |
| 5,042,029 | 8/1991 | Takase et al. | 370/60 |
| 5,067,126 | 11/1991 | Moore | 370/84 |
| 5,084,877 | 1/1992 | Netravali et al. | 370/60 |
| 5,091,907 | 2/1992 | Wettengel | 370/84 |
| 5,153,877 | 10/1992 | Esaki et al. | 370/94.1 |

FOREIGN PATENT DOCUMENTS 0234859 9/1987 European Pat. Off. .

OTHER PUBLICATIONS

"Routing and Flow Control in High Speed Wide–Area Networks", by N.F. Maxemchuk, Proceedings of IEEE, Jan., 1990, No. 1.
"Congestion Control Through Input Rate Regulation", by Moshe Sidi, IEEE, 1989, IBM Watson Research Center.
"Multirate Voice Coding for Load Control on CSMA/CD Local Computer Networks", Frost et al., IEEE Computer Society, pp. 10–19, 1985.
"Design of a Multistage Self–Routing Switch with a Distributed Cell Sequence Control", Obara, NTT Transmission Systems Laboratories, vol. 73, No. 10, 1990, pp. 14–27.

Primary Examiner—Douglas W. Olms
Assistant Examiner—Dang Ton

[57] ABSTRACT

A cell including a time stamp, first cell sending rate, first requested cell sending rate is transmitted from a transmitting side to a receiving side. At the receiving side a second cell sending rate is determined based on the first requested cell sending rate, and a second requested sending rate is determined based on the first cell sending rate and the cell discard information. The second requested cell sending rate is transmitted from the receiving side to the transmitting side to determine the first cell sending rate based on the cell discard information detected at the receiving side. Therefore, the cell sending rate is determined in accordance with a frequency of the discard of the cells so that the cell sending rate is decreased when the cell discard occurs and the cell sending rate is increased when the cell discard does occur.

12 Claims, 14 Drawing Sheets

DETECTING DISCARD

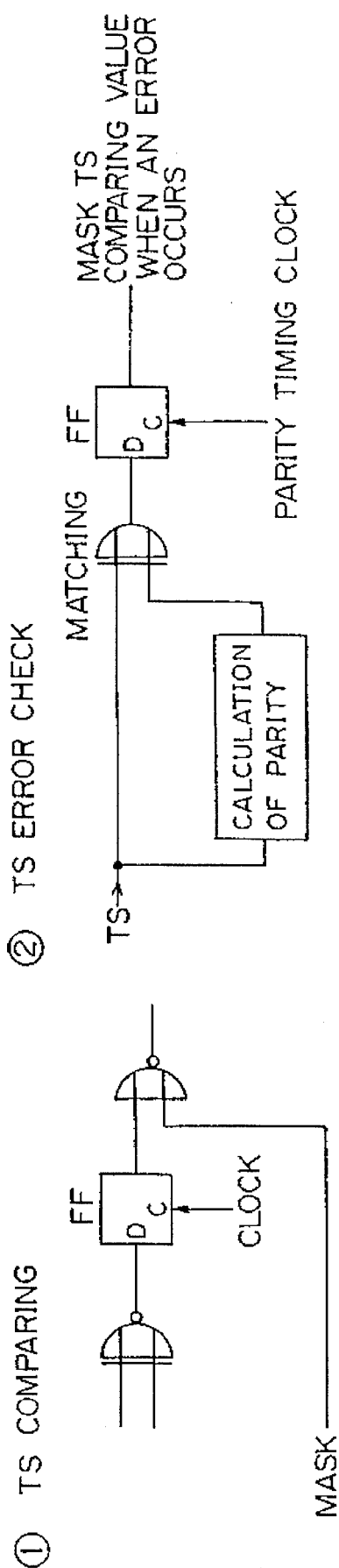
FIG.5B ② TS ERROR CHECK
FIG.5A ① TS COMPARING

ATM TRANSMISSION SYSTEM WITH A VARIABLE TRANSMISSION RATE

BACKGROUND OF THE INVENTION

The present invention relates to an asynchronous transfer mode (ATM) system with a variable cell transmission rate used for transmitting and receiving voice and image signals.

An ATM network for a broadband integrated service digital network (B-ISDN) provides integral system services comprising image, voice, data, etc. as shown in FIG. 1. An ATM line 1 is connected to an ATM transmission station 2, which is connected to a terminal equipment (TE) for providing a subscriber's bus 3 with a telephone, a TV phone, a TV conference, a CATV, data terminal services, etc, Ebrough a network terminal. In the image and voice terminal equipment (TE) a CODEC (encoding and decoding) unit for inputtng and outputtng image and voice signals is provided. As this unit is designed for sending image and voice information as soon as when they are input, it is difficult to restore transmitted information if it is once discarded, causing inconvenience to the time axis process. Thus, a means is required for solving this problem.

An ATM system such as that described above is only in the development stage. No practical embodiment is yet available. However, the following processes have been investigated concerning the discard of a cell, i.e., a unit of transmission information, which is caused to occur in the transmission line and station:

1. correcting information
2. performing progressive encoding to limit the influence of discard to produce the minimum deterioration of images
3. controlling an encoding rate only on the cells discarded on the transmitting point.

However, each process has its problems. In the first process, complete correction becomes impossible with large scale hardware and large volumes of transmitted information. In the second process, it is difficult to realize an algorithm because the discard of cells occurs randomly. In the third process, it is impossible to control all discarded cells in the transmission network.

If a discard of cells is permitted, a burst error may occur. If the data quantity of discarded cells exceeds the contained data of the receiving buffer, an underflowing may occur, causing a discontinuity in the time series process and breaks in images and voice. Furthermore, it is no use adopting an ATM method in a system which can only use a transmission line at a rate that does not cause a discard of cells.

SUMMARY OF THE INVENTION

Therefore, an object of the present invention is to realize an ATM system for sending data encoded at rates that minimize the discard of cells according to the state of the ATM line.

A feature of the present invention resides in an ATM variable rate transmission system for performing two-way ATM transmission between a transmitting terminal and a receiving terminal through a transmission line comprising a means for detecting discarded cells in the data transmitting and data receiving operations; means for transmitting information of a cell discard detected by the receiving terminal, to the transmitting terminal through a returning line 1-2 of said transmission line; the discard being caused to occur in a going line 1-1 of the transmission line, so that the number of cells to be transmitted is controlled according to frequency of the occurrence of said cell discard.

BRIEF DESCRIPTION OF THE DRAWINGS

FIG. 5A shows a block diagram of the time stamp comparing circuit used in the time stamp check circuit in the embodiment, FIG. 5B shows a block diagram of the time stamp error checking circuit with a parity check circuit used in the time stamp checking circuit in the first embodiment.

PREFERRED EMBODIMENTS OF THE PRESENT INVENTION

Figure 1:
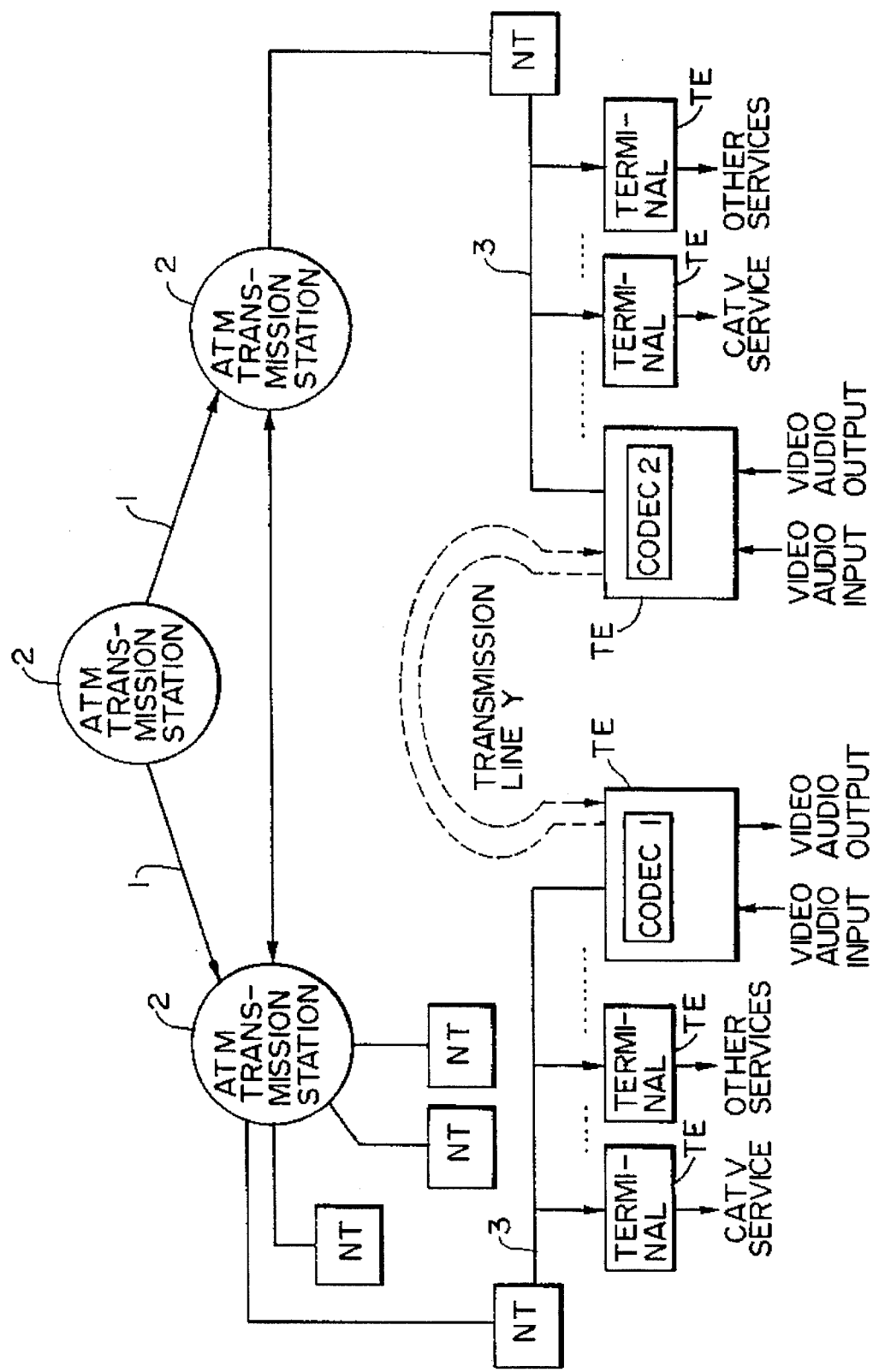
FIG. 1 is a block diagram of a general ATM network.
Figure 2A:
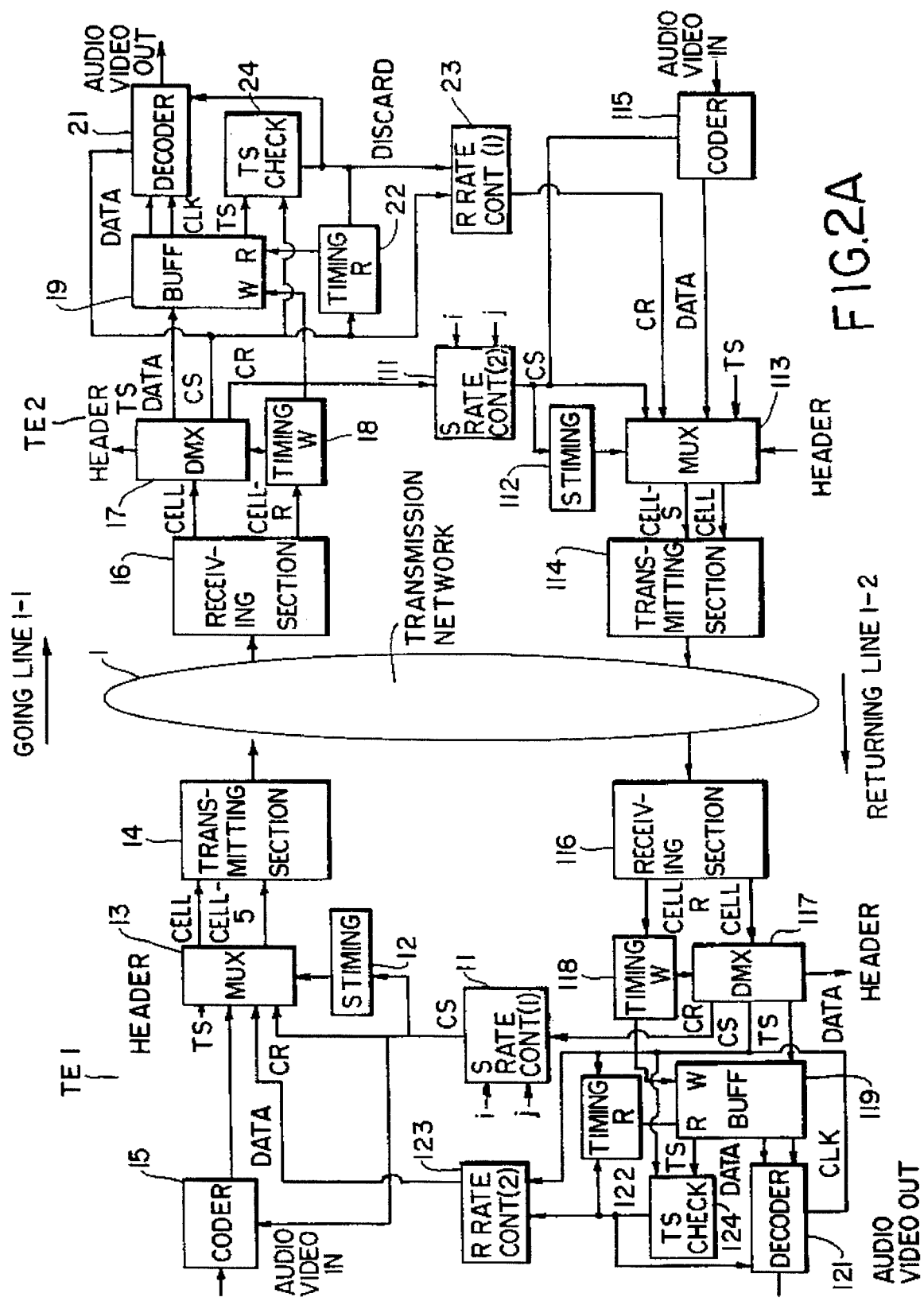
FIG. 2A is a block diagram of a first embodiment of the present invention.

FIG. 2A shows a block diagram of the first embodiment of the present invention.

Figure 2B:
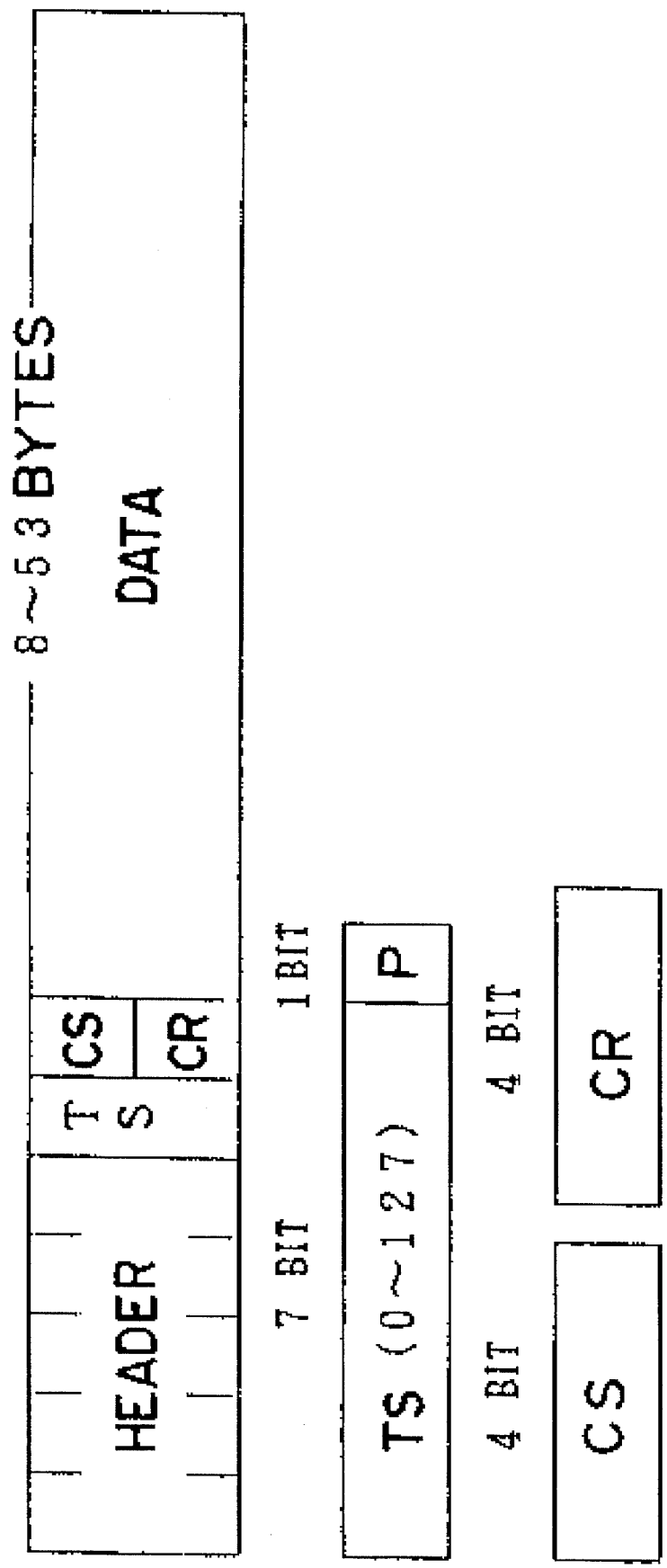
FIG. 2B shows the cell format used in the first embodiment shown in FIG. 2A.

The minimum value i and the maximum value j of the cell sending rate CS determined by a contract for occupying a band for an ATM network are previously set in cell sending rate controller (1) 11. The present embodiment is designed so that it starts an operation at an initial cell sending rate CS within the scope determined by the minimum value i and the maximum value j when a power source turns on. The multiplexer 13 multiplexes a header, time stamp TS, cell sending cell rate CS, requested cell sending rate CR and data to compose a cell. An example of a cell format is shown in FIG. 2B. The cell comprises the header, time stamp TS, receiving side cell discard information comprising CS and CR, and data of 5 to 53 bytes. Time stamp TS comprises 7 bits and designates a count number 0 to 127 of the sequence of cells to be set, P comprises 1 bit and designates a parity of the TS part. CS designates a cell sending rate (0 to 15) with 16 kinds and CR is a requested cell sending rate (0–15) with 16 kinds for sending a request of the cell sending rate to an opposite terminal equipment TE. The cell sending rate CS and requested cell sending rate CR are used for recognizing the discard of cells at a receiving terminal.

Coder 15 receives audio data or video data and provides digital data to compose a part of the cell. CS is inputted to coder 15 by cell sending rate controller 11 to determine a coding rate. CS is also inputted by cell sending rate controller 11 to sending timing circuit 12 and multiplexer 13 to determine a cell sending rate. When an ATM transmission line 1 is provided between terminal equipments TE1 and TE2, a discard of cells occurs when the amount of the information exceeds the transmission rate on the Bus. The discard of cells occurs likewise in each node in the ATM line (for example, in ring bus connecting stations). The cell format comprises a time stamp (TS) indicating the cell transmission order. The mulltiplexer 13 provides the cell to a sending section 14 together with a cell head signal (CELL-S) and hence to an ATM network.

Receiving section 16 receives the cell and detects the cell head signal (CELL-R) to obtain a cell synchronization. The cell is then provided to demultiplexing unit 17 and the cell head signal (CELL-R) is provided to write timing circuit 18. Write timing circuit 18 generates clocks for the cell byte period (=53 bytes per cell) and thus demultiplexing unit 17 separates the cell into the header, TS, CS, CR and data. Write timing circuit 18 generates the necessary amount of write clocks to be used for demultiplexer 17 and buffer 19 so that time stamp TS and data are written in buffer 19.

A requested cell sending rate CR is separated in demultiplexer 17 and is input to cell sending rate controller (2) 111 at the receiving terminal TE 2 so that requested cell sending rate CR determines cell sending rate CS which is used for a returning transmission line. Cell sending rate CS is a cell sending rate of the going transmission line and is entered into decoder 21, read timing circuit 22, requested cell sending controller (1) 23, and time stamp check circuit 24. Buffer 19 absorbs the time difference caused by a cell delay on the ATM line 1 and provides the data to decoder 21. Decoder 21 decodes the data to produce an audio or video output. Read timing circuit 22 generates a read clock so that the data is read from buffer 19 at a rate suitable for decoder 21, and changes the rate of the read clock depending on cell sending rate CS. Receiving rate controller (1) 23 updates requested cell sending rate CR as a function of cell sending rate CS. Time stamp TS is read from buffer 19 at a constant for the each rate which is changed according to cell sending rate CS and is input to time stamp check circuit 24. Time stamp check circuit 24 determines cell discard by detecting a lack of the time stamp TS as the lack of the time stamp TS corresponds to a discarded cell. Time stamp check circuit 24 provides the cell discard information to read timing circuit 22, decoder 21, and requested cell sending controller (1) 23. Receiving rate controller (1) 23 determines a requested cell sending rate CR based on received cell sending rate CS and cell discard information.

Sending rate controller (2) 111 produces a cell sending rate CS based on requested cell sending rate CR outputted from demultiplexer 17. Cell sending rate CS is then applied to sending timing circuit 112 to form a sending clock to be applied to multiplexer 113. Cell sending rate CS is also inputted to a coder 115 to determine a coding rate when an audio data or a video data inputted to coder 115 is coded to the digital data. Receiving rate controller (1) 23 provides requested cell sending rate CR to multiplexer 113. Multiplexer 113 composes a cell by using a header, time stamp TS and cell discard information comprising cell sending rate CS, requested cell sending rate CR and the data. Multiplexer 113 applies the cell together with the cell head signal cell-s onto ATM transmission line 1 through transmitting section 114. Receiving section 116 in the opposite terminal equipment 1 receives the cell to provide the cell to demultiplexer 117 and the cell head signal (CELL-R) to write timing circuit 118. Demultiplexer 117 separates requested cell sending rate CR from the cell to provide the same to cell sending rate controller(1) 11 to determine cell sending rate CS based on requested cell sending rate CR. When the cell discard is detected by time stamp check circuit 24, requested cell sending rate CR requests the transmission rate to be decreased so that the transmission rate on the ATM transmission line is decreased. When the cell discard is not detected by time stamp check circuit 24, the requested cell sending rate CR increases the transmission rate of transmission line 1 by increasing cell sending rate CS. The operation of buffer 119, reading timing circuit 122, time stamp check circuit 124, decoder 121 and requested cell sending controller 123 is the same as that of buffer 19, reading timing circuit 22, time stamp check circuit 24, decoder 21 and requested cell sending controller 23, and thus their explanation is omitted.

In the embodiment shown in FIG. 2A, the transmission rate of terminal equipment TE1 can be controlled by detecting the cell discard information in opposite terminal equipment TE2. Cell sending rate CS is transmitted from terminal equipment TE1 to terminal equipment TE2 through a going transmission line and requested cell sending rate CR is determined in opposite terminal equipment TE2 based on cell sending rate CS and the cell discard information. Requested cell sending rate CR is transmitted from terminal equipment TE2 to terminal equipment TE1 through the returning transmission line. Requested cell sending rate CR determines cell sending cell CS of terminal equipment TE1 to increase or decrease the transmission rate of the data from terminal equipment TE1 to terminal equipment TE2 based on the cell discard information detected in opposite terminal equipment TE2.

Decoder 21 is notified of the output of TS check circuit 31 and it compensates for the discard data if necessary by inserting a dummy cell. Decoder 21 may switch a demodulated rate depending on the cell sending cell CS, thereby allowing voices and images to be reproduced appropriately.

Figure 3:
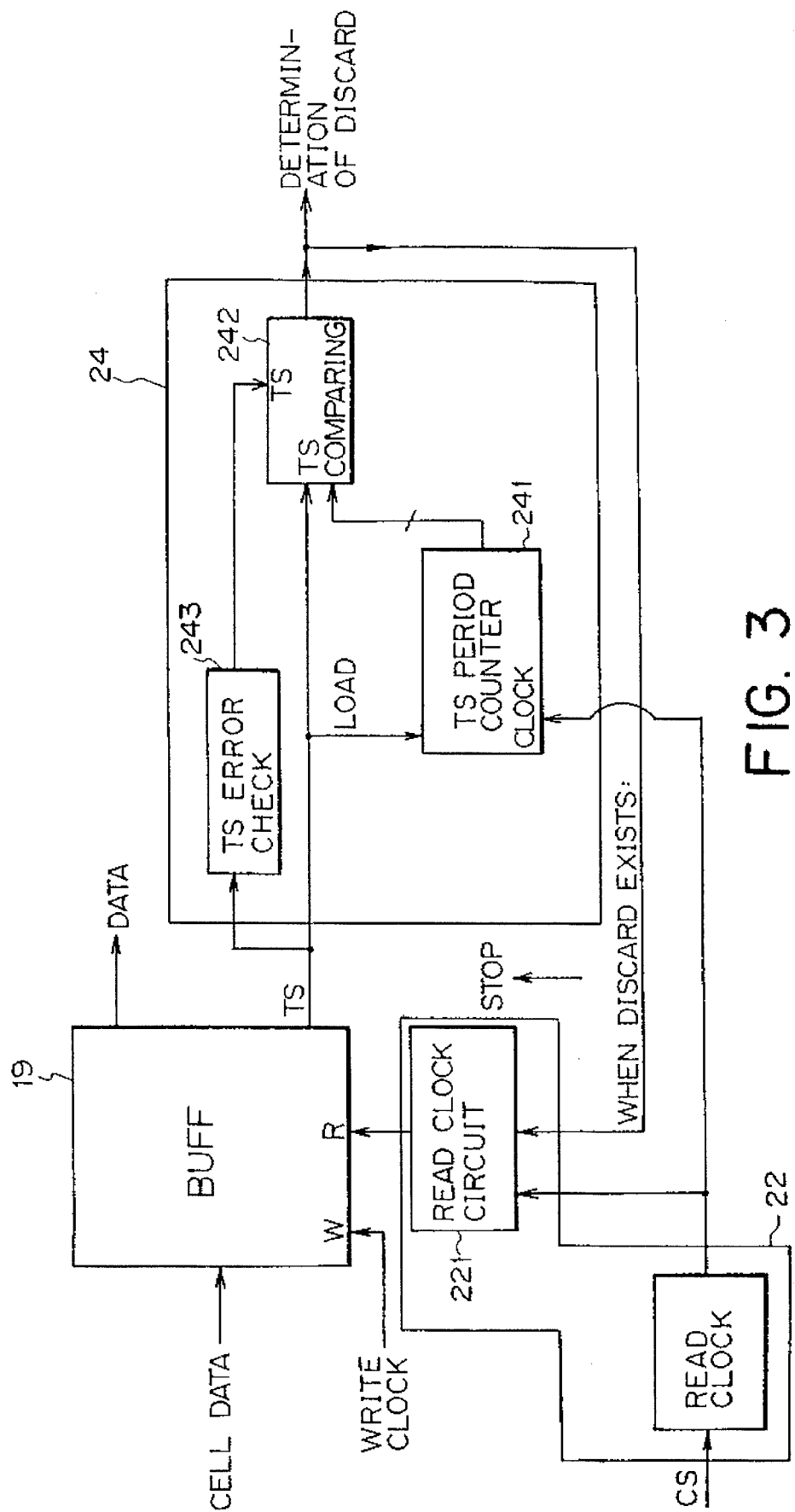
FIG. 3 is a circuit diagram of a time stamp check circuit in which the cell discard is detected.

As shown in FIG. 3, time stamp check circuit 24 compares a time stamp read from buffer 19 with the output of self-running TS period counter 241, which operates at a constant rate, thereby allowing the cell discard to be detected by using time stamp comparing circuit 242. A counting rate of time stamp period counter 241 is switched according to sending cell rate CS.

Figure 4A:
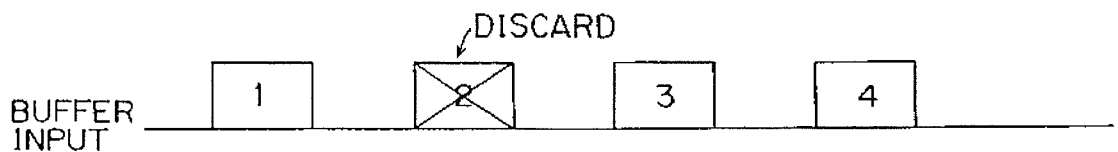
FIGS. 4A to 4I show a timing chart for explaining the detection of the cell discard in the embodiment shown in FIG. 2A.
Figure 4B:
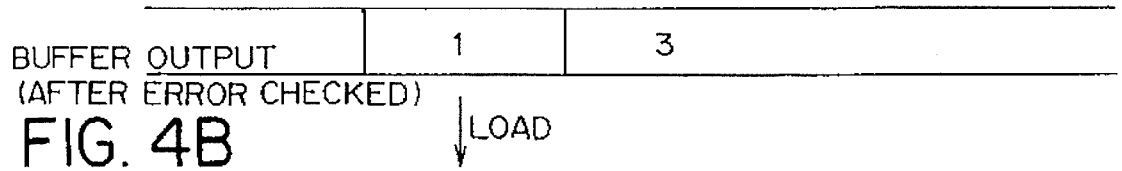
Figure 4C:
Figure 4D:
Figure 4E:
Figure 4F:
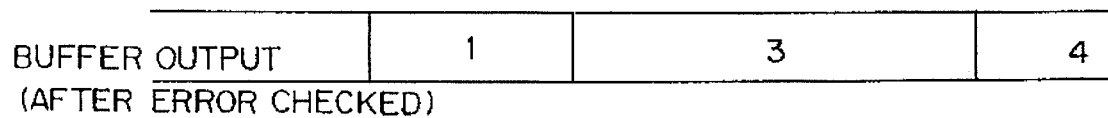
Figure 4G:
Figure 4H:
Figure 4I:

As shown in FIG. 4A, suppose that cell #2 is discarded and data 2 disappears in the input of buffer 19. As shown in FIGS. 4B and 4C, data #1 is loaded in time stamp period counter 241 upon a receipt of data #1. When the time stamp read from buffer 19 is 3 but the output of TS period counter 241 is 2. Thus, time stamp comparing circuit 242 provides a signal designating the existence of the cell discard as shown in FIG. 4D. This signal is fed back to read timing circuit 22 and read clock circuit 221 removes a single read clock as shown in FIG. 4E. Thus, the time stamp of the output of buffer 19 maintains data 3 at the next clock as shown in FIG. 4F. When the TS counter output couts up to 3 (FIG. 4G), time stamp comparing circuit 242 produces a matching signal (low-active) designating the non-existence of the cell discard (FIG. 4H). This signal is fed back to read clock circuit 221 and normal operation of the read clock is resumed (FIG. 4I). Thereby, as described above, the cell discard is detected by comparing the output counter value of time stamp period counter 241 and the time stamp value. When an incoincidence occurs in the comparing operation, the read out operation from buffer 19 is stopped as shown in FIG. 4E. TS period counter 241 operates in a self-running mode and when the output of TS period counter 241 (FIG. 4G) reaches the value of the time stamp at a timing of data 3, the read clock starts again as shown in FIG. 4I.

When a cell discard occurs as shown in FIG. 4D, read timing circuit 221 stops the read clock and the number of stopped read clocks corresponds to the number of discarded cells so that a time difference along the time axis is absorbed. An output of buffer is also applied to time stamp comparing circuit 242 through time stamp error checking circuit 243. When an error occurs in the time stamp, time stamp comparing circuit 242 provides a signal designating the non-existence of the cell discard so that the error in the time stamp can be distinguished from the cell discard.

As shown in FIG. 5A, time stamp comparing circuit 242 comprises an exclusive NOR circuit, the D-FF and NOR circuit. When the time stamp output from buffer 19 does not coincide with an output of counter 241, the D-FF produces "0" signal and the NOR circuit produces "1" signal, thereby designating cell discard when a mask signal is applied to the NOR circuit from TS error checking circuit 243, the output is made "0".

FIG. 5B shows a circuit 243 for checking the time stamp error. When the parity data of the input data does not coincide with the output of the parity calculation circuit to which the data is input, D-FF sets signal "1" signal, thereby designating the existence of an error in the time stamp signal.

The above discard detection result is entered into requested cell sending controller (1) 23. The requested cell sending rate value is calculated according to the following flowchart and is input to the returning transmission line 1-2 through multiplexer 113.

Figure 6:
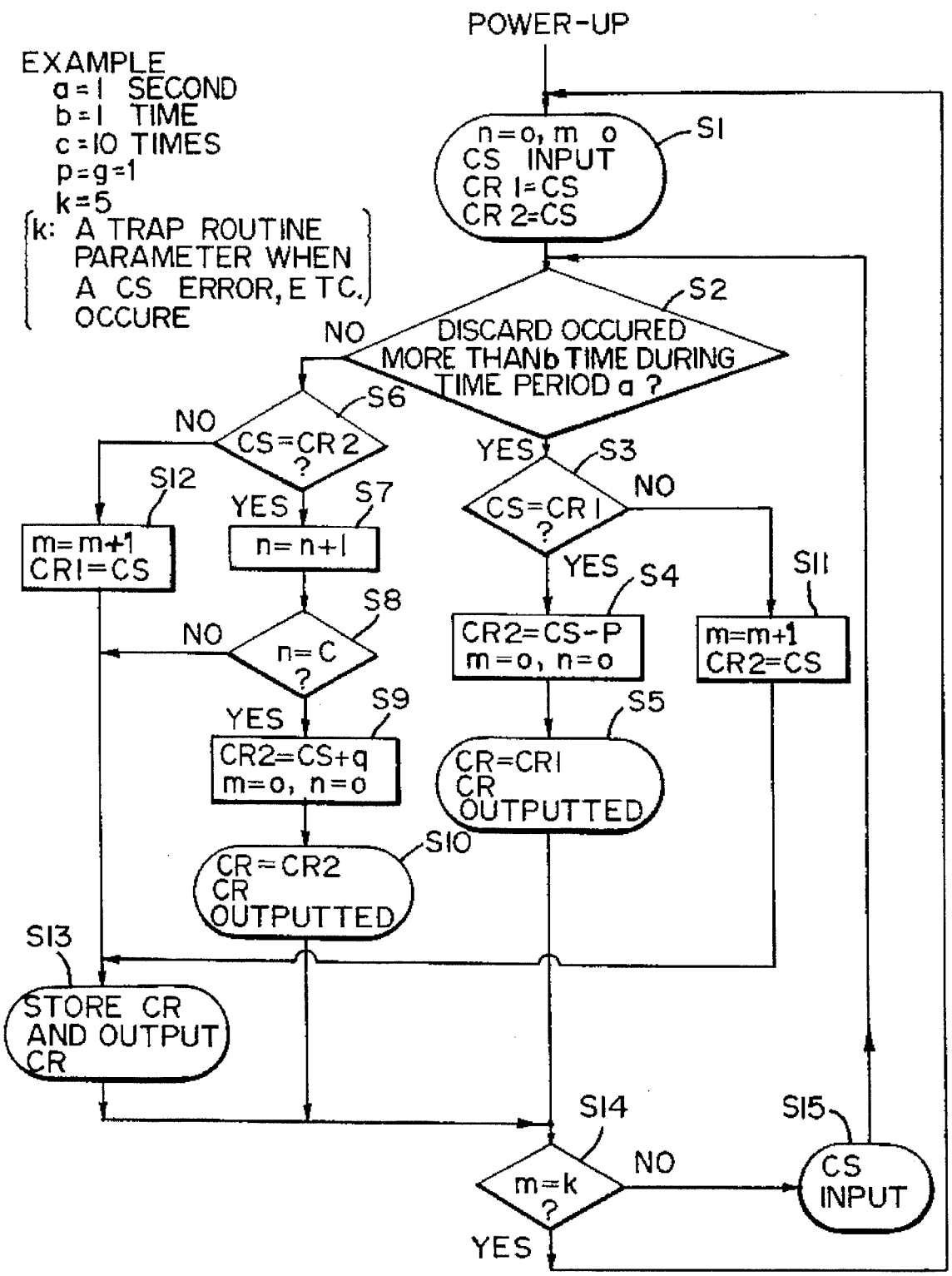
FIG. 6 shows a flowchart for explaining the operation of a requested cell sending controller used in the first embodiment.

The flowchart shown in FIG. 6 designates how CS input is converted to CR output in requested cell rate controller (1) 23. The flowchart is divided into steps S3, S4 and S5 for requesting a decrease in the CR value and steps S6, S7, S8, S9 and S10 for requesting an increase in the CR value. As an example of respective parameters a=1 sec, b=1, c=10, p=q=1 and k=5 are considered.

At step S1, n and m are initialized and the present CS is entered into CR1 and CR2. At step S2, the process determines whether the cell discard occurs more than "b" times within a period "a". If the result of the step S2 is YES, the process determines whether CS=CR1 at step S3. If the result of step S3 is YES, the present CS-P is entered into CR2, thereby decreasing CS by p. CR1, whose rate is decreased, is output as CR at step S5.

If the cell discard does not occur more than b times during the period a, the present CR2 is compared with CS. If CS is equal to CR2, n is incremented by 1 and it is determined at step S8 whether n is equal to C, which is the given number, for example, 10. When n is smaller than 10, the amount of discarded cells is deemed to be small and the present CS is output as CR at step S13 and thus is maintained. When n becomes 10, it is considered that the rate of discard of a cell is very low and the present CS is increased by q and entered into CR2 at step S9, thereby outputting CR2 as a CR output at step S10.

Where CS is not equal to CR1 at step S3 or CS is not equal to CR2 at step S6, m is incremented and the present CS is entered into CR2 or the present CS is entered into CR1 (at steps S11 and S12), thereby maintaining the present CR to output CR (at step S13). Steps S11 and S12 wait until CS becomes CR1 or CR2. The main flows are stopped so that a cell rate control is prevented from entering into a wide-run operation because of a too fast or too slow cell rate. When the main flows are stopped, the present CR value is maintained. At step S8, n is not equal to c and then CR is also maintained, thereby outputting CR. When CR is outputted it is determined whether m is equal to K (5 times) at step S14. If m reaches 5 times, the process is returned to the initial state at step S1, thereby preventing the requested cell sending rate from being fixed to the minimum value i or the maximum value j set in the cell sending rate controller (1) 11 provided at the sending,side. If the m does not reach 5 times, the new CS is inputted at step S15 and at step 2, the ratio of the discard is again set. K is a parameter for a trap routine when a CS error occurs or CS is sticked to i or j.

The above parameters and flowcharts are used as examples. Other variations can be used. For example, "a" can be set not as a time unit but as the number of received cells; some protecting steps can be used to prevent extreme fluctuations of the CR value in a flow. In another embodiment, i and j are determined by requested cell sending controller (2) 33 provided at the receiving side. Then, in case of requested cell sending rate CR=p or requested cell sending rate CR=q, the decrease and increase flowcharts are stopped.

Thus, flows and parameter values can be obtained which decrease the occurrence of discards based on the characteristics of discards in the ATM line, and perform a rapid operation at an appropriate cell rate covering the variable characteristics of discards. Basically, for a desired flow, where i=<C, R=<j, the CS used decrease the CR value to decrease the transmission cell rate when a discard occurs and increases the CR value to increase the transmission cell rate when no discard occurs.

The CR value thus determined is sent to the opposite terminal equipment TE1 through the returning line 1-2 of the transmission network, separated by demultiplexer 117, and then inputted to cell sending rate controller(1) 11.

Figure 7:
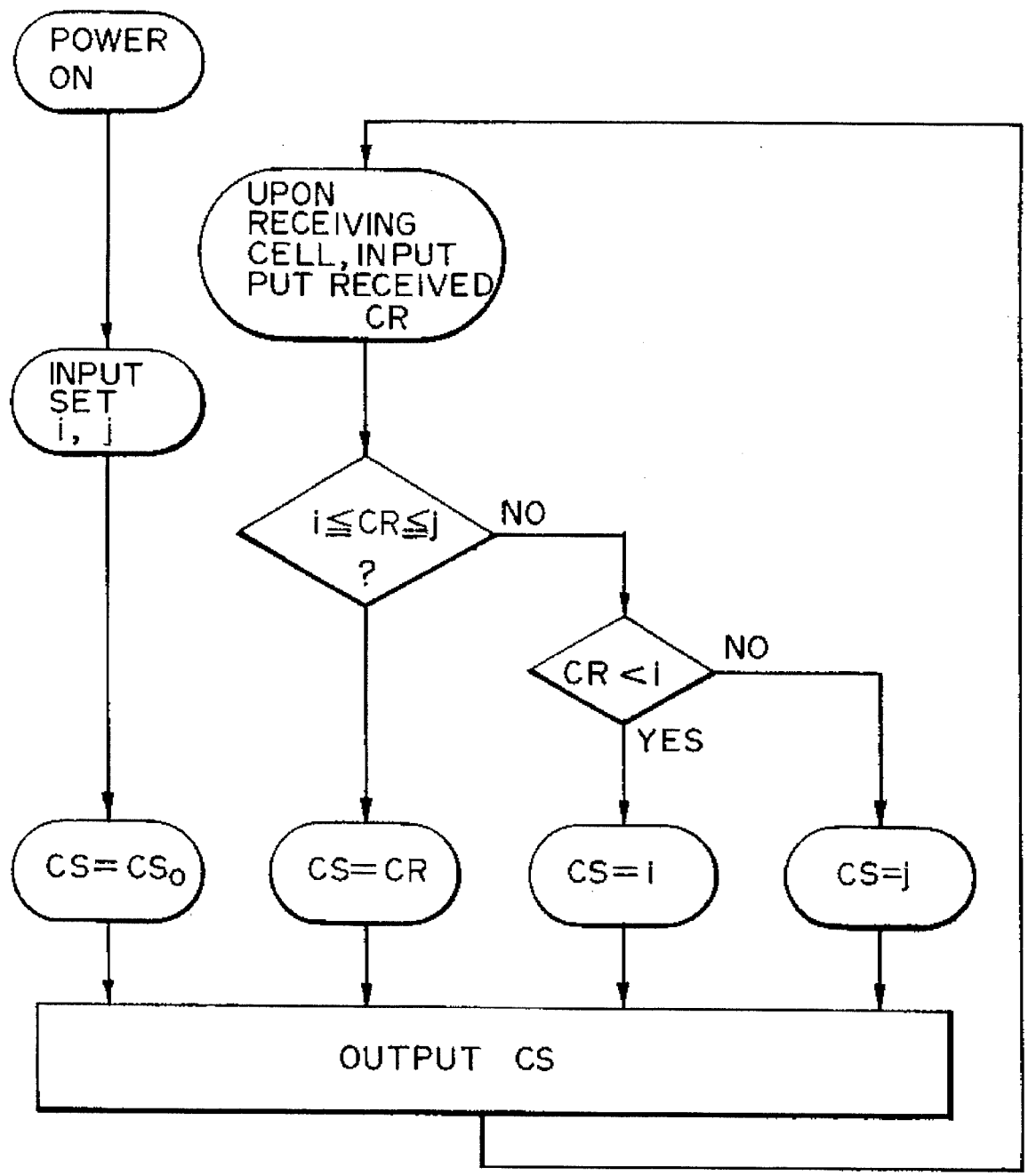
FIG. 7 shows a flowchart for explaining the operation of a cell sending rate controller used in the first embodiment.

The operation of cell sending rate controller(1) 11 is shown in FIG. 7. The cell sending rate controller 11 receives requested sending cell rate CR. If i=<CR=<j, CS=CR and CS is outputted. If CR is not within the above range, the limited value i or j is outputted as CS. The initial value of CS is outputted when the power turns on.

Figure 8:
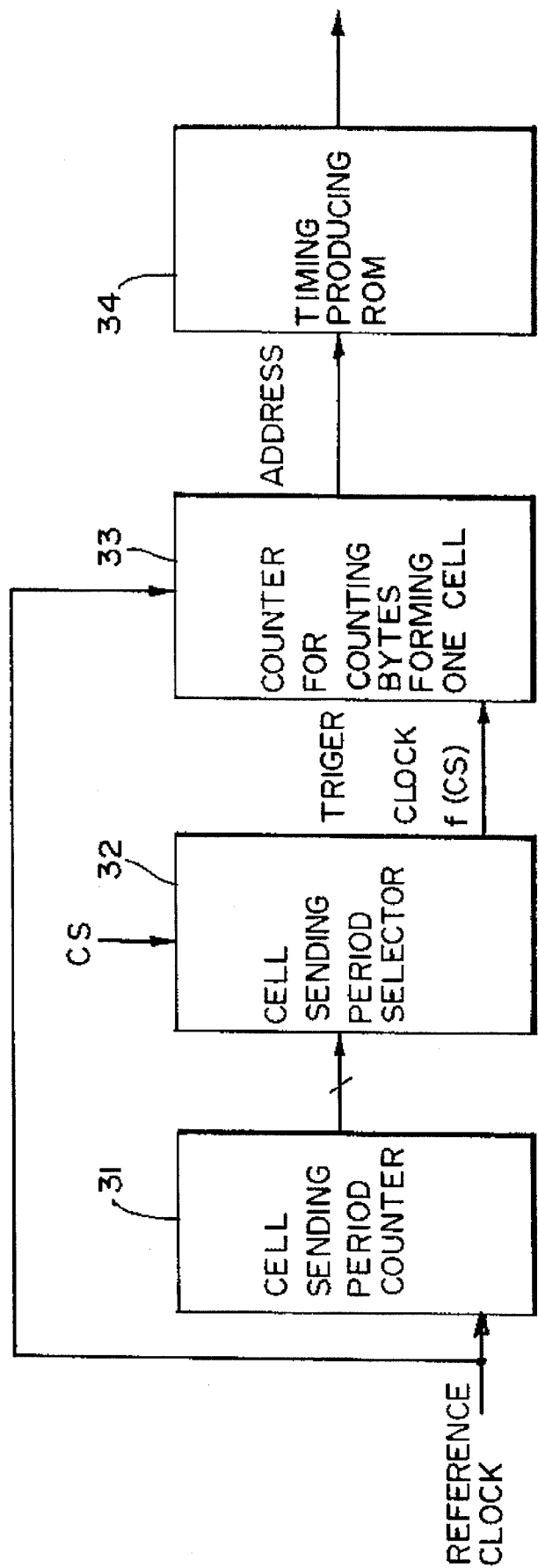
FIG. 8 shows a block diagram of a sending timing circuit used in the first embodiment.

FIG. 8 is a block diagram of a sending timing circuit 12. A reference clock is input to cell sending period counter 31 to produce the cell sending period corresponding to the cell sending rate CS. The number of kinds of outputs from this counter 31 is equal to that of the cell sending rate CS, for example, 16. The cell sending rate means the number of cells that can be sent within a predetermined time period. The outputs of the counter 31 are input to cell sending rate selector 32 in which one of the cell sending rates is selected in accordance with the value of the inputted cell sending rate CS, thereby outputting a trigger clock of a frequency f (CS). Thus, the cell sending rate can be selected from the value of the CS. Cell sending rate CS is determined from the requested cell sending rate CR in accordance with the flowchart shown in FIG. 7 and the requested cell sending rate CR is determined by the cell sending rate CS and the discard of the cell in accordance with the flowchart shown in FIG. 6. The output of selector 32 is applied to a counter 33 for counting bytes forming one cell. Counter 33 produces the clocks during the period of one cell. The output of counter 33 is applied to timing producing ROM 34. Counter 33 outputs a clock signal corresponding to the number of bytes of one cell every time it receives a pulse input in cell sending period 1/f (1/CS) selected by selector 32. Timing producing ROM 34 supplies a timing clock to various parts of the system when it receives a clock signal corresponding to one cell.

Figure 9:
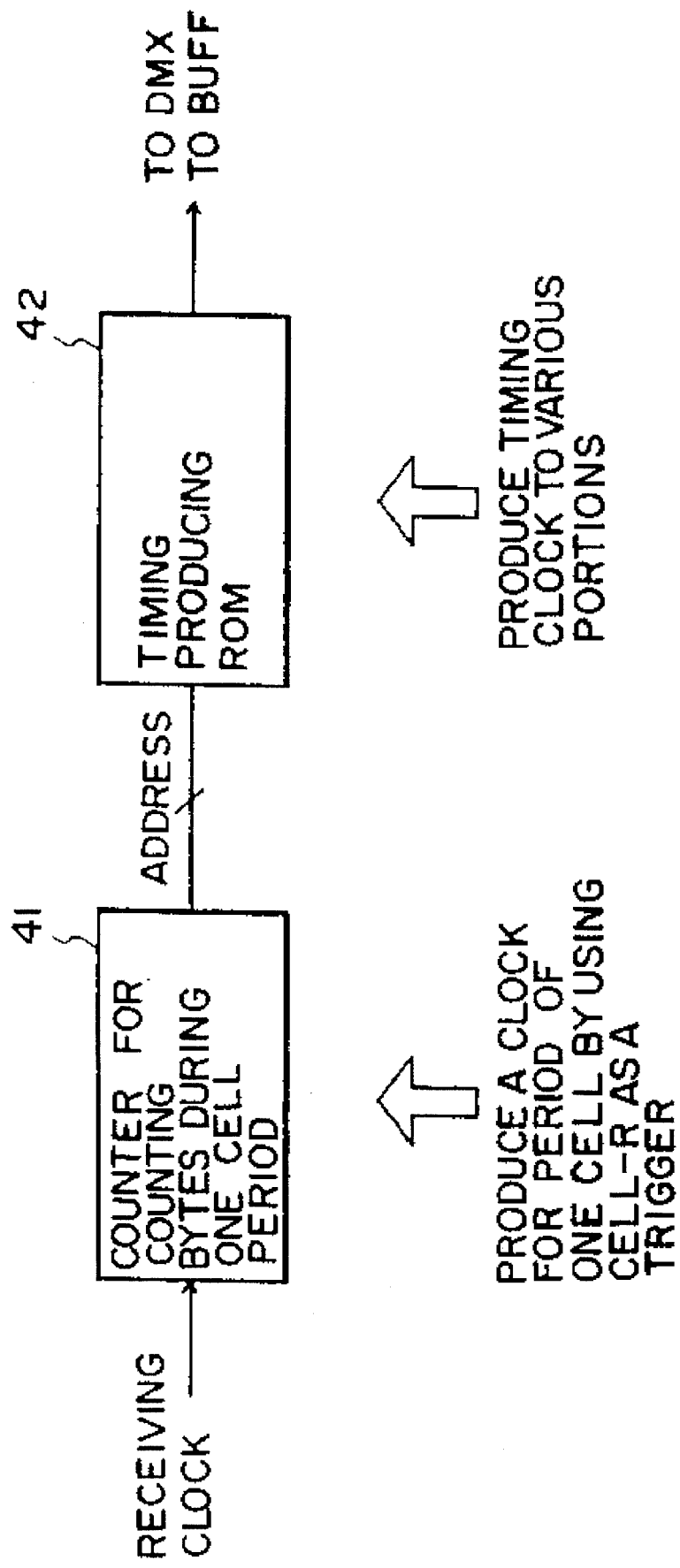
FIG. 9 shows a block diagram of a write timing circuit used in the first embodiment.

FIG. 9 shows a block diagram of a write timing circuit 18. A counter 41 for counting bytes during one cell period receives a receiving clock and the head of the cell signal and produces clocks corresponding to the period of one cell as using the head of the cell signal as a trigger. The output of counter 41 is applied to timing producing ROM 42 to supply clocks to various portions of the system, for example, demultiplexer 17 and buffer 19.

Figure 10:
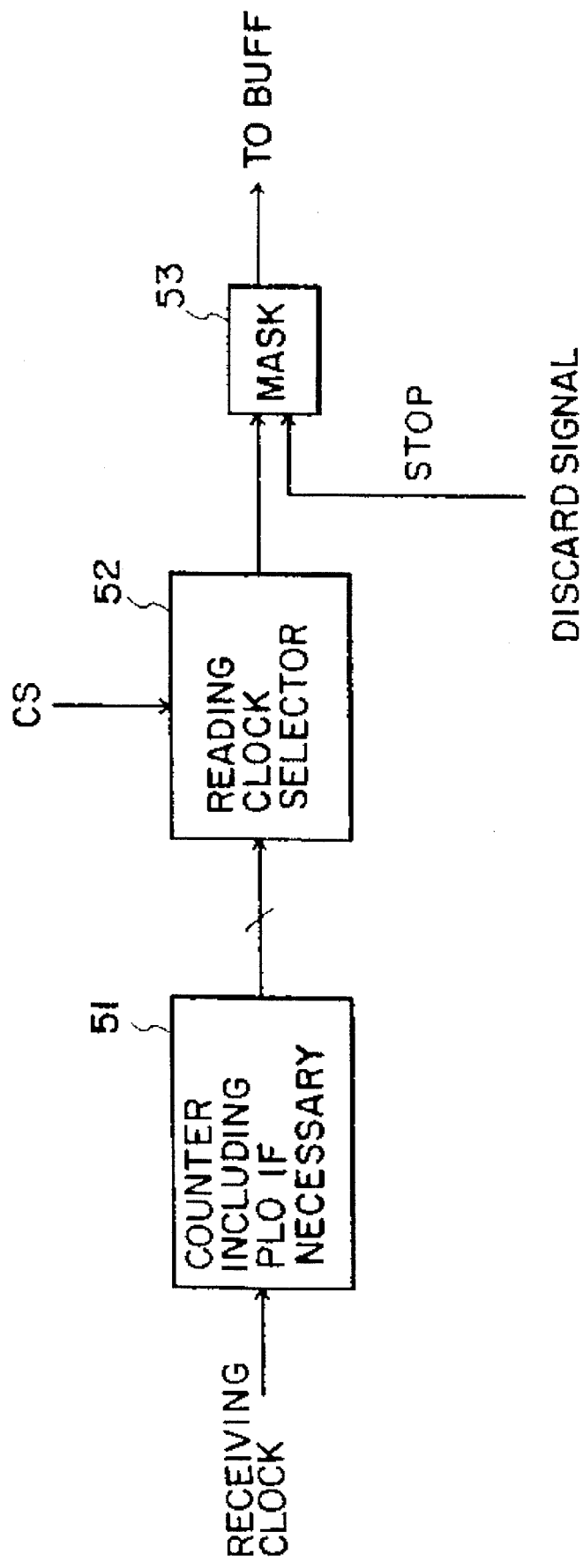
FIG. 10 shows a block diagram of a read timing circuit used in the first embodiment.

FIG. 10 shows a block diagram of read timing circuit 22. Counter 51 includes a PLO for receiving a clock to produce a read clock the number of kinds of which corresponds to the number of sending cell rates. The output of the counter 51 is applied to a read clock selector 52 in which the number of kinds of read clocks is selected in accordance with the sending cell rates. The output of the selector 52 is applied to the mask circuit 53 for stopping the output of the selector 52 when the cell discard signal is applied to the mask circuit 53. Thus, the cell discard occurs, and the output of the read timing circuit 22 is stopped.

By likewise setting TS, CS, CR, and data flowing in the returning line 1-2 of the transmission line 1, a complete two-way ATM variable rate transmission unit can be configured.

Figure 11:
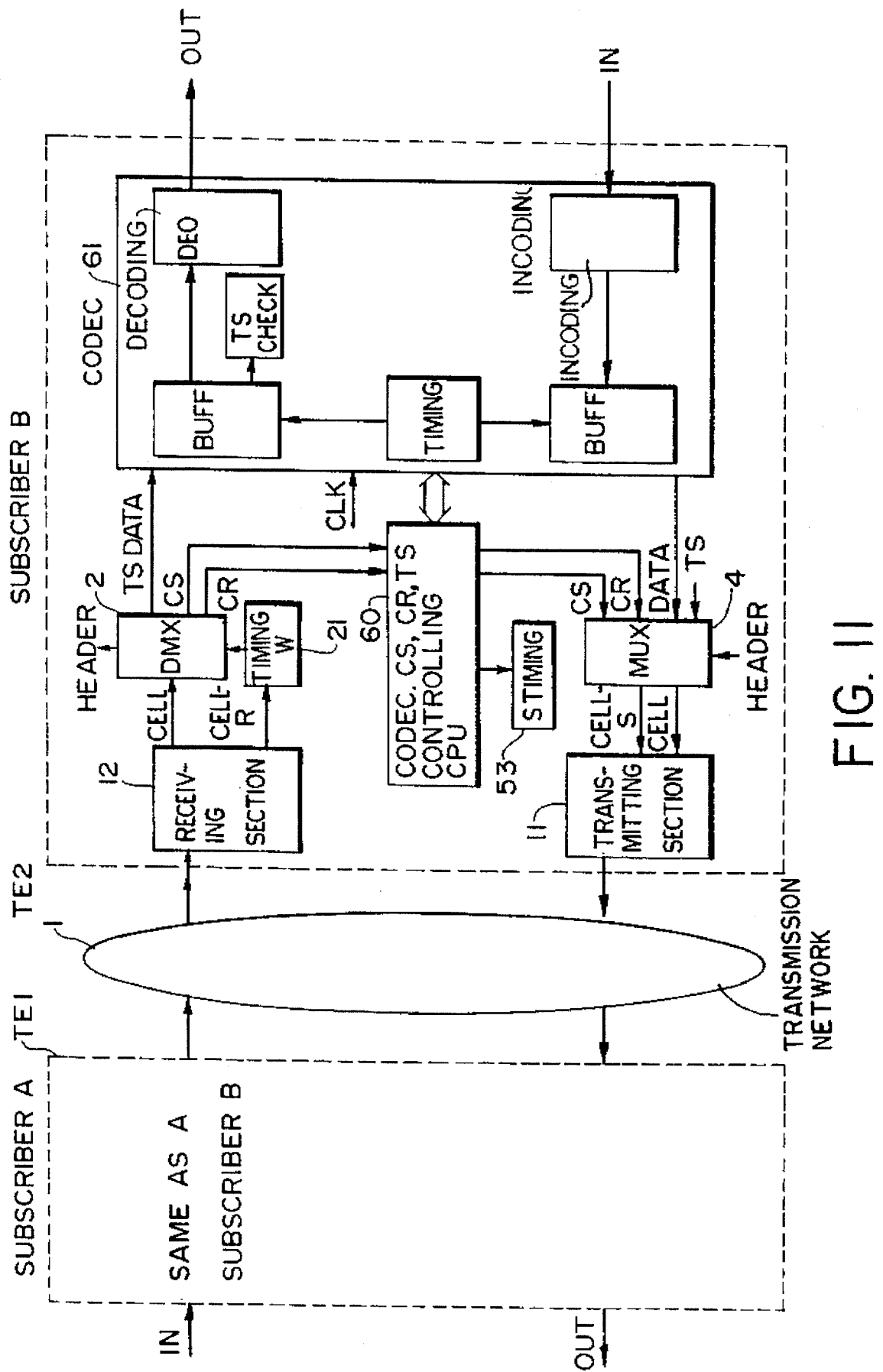
FIG. 11 shows the second embodiment of the present invention.

According to the second embodiment shown in FIG. 11, it is desirable for a CPU 60 to control the requested cell sending controller (1) 23 and cell sending rate controller (2) 111, and TS checking unit 24. These elements can be used with a CODEC unit 61 if they are installed with a CPU 60. CODEC 61 includes buffers, TS check unit, timing circuits, coder and decoder. The flowchart of the process is the same as that shown in FIGS. 6 and 7. Based on the premise that a buffer operation is performed by the CODEC unit 61, it is not described here as it varies depending on the encoding mode. The TS check may be executed outside the CODEC unit 61.

Figure 12A:
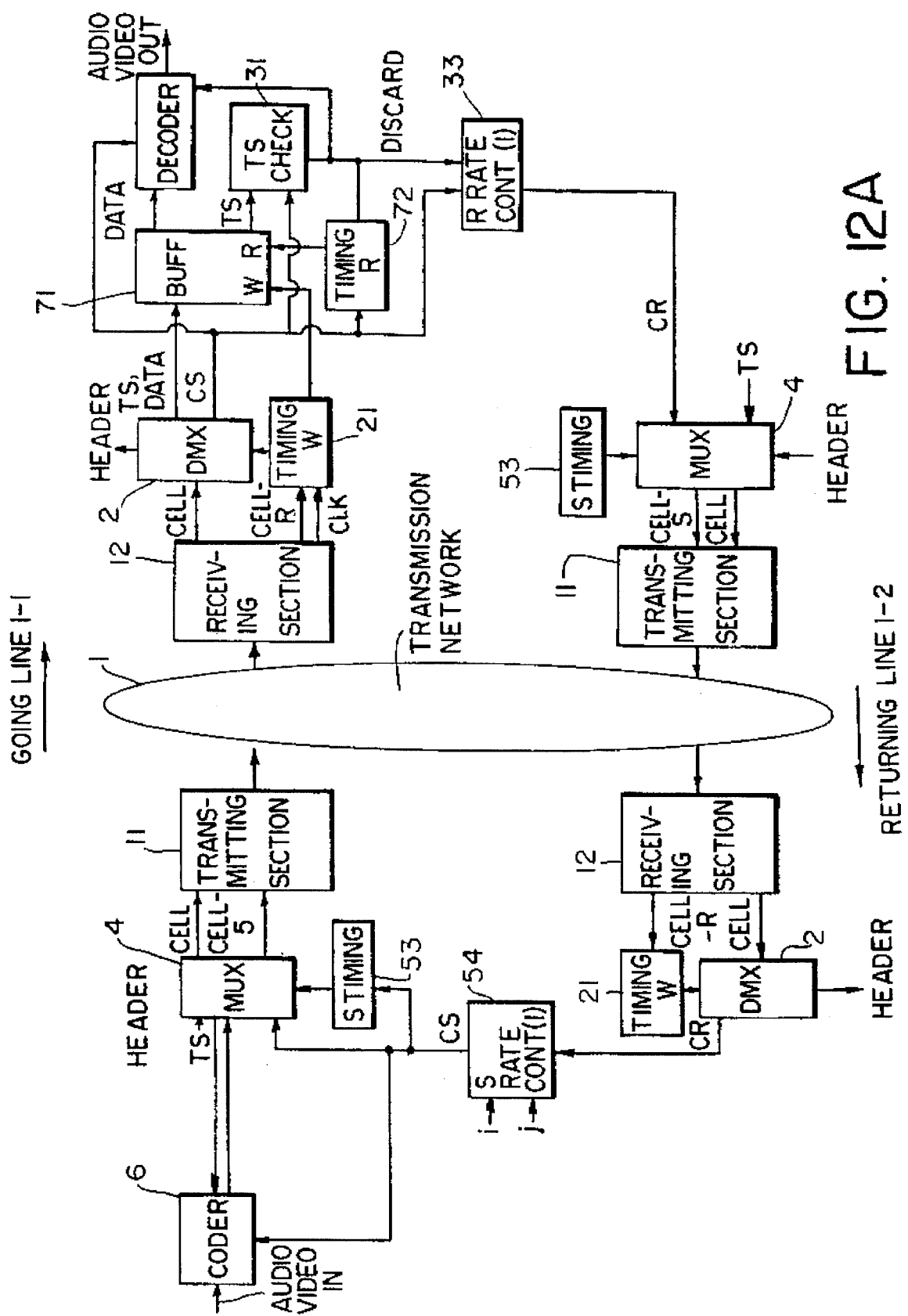
FIG. 12A shows a block diagram of the third embodiment of the present invention.

A further embodiment relating to incomplete two-way transmission is shown in FIG. 12A.

Figure 12B:
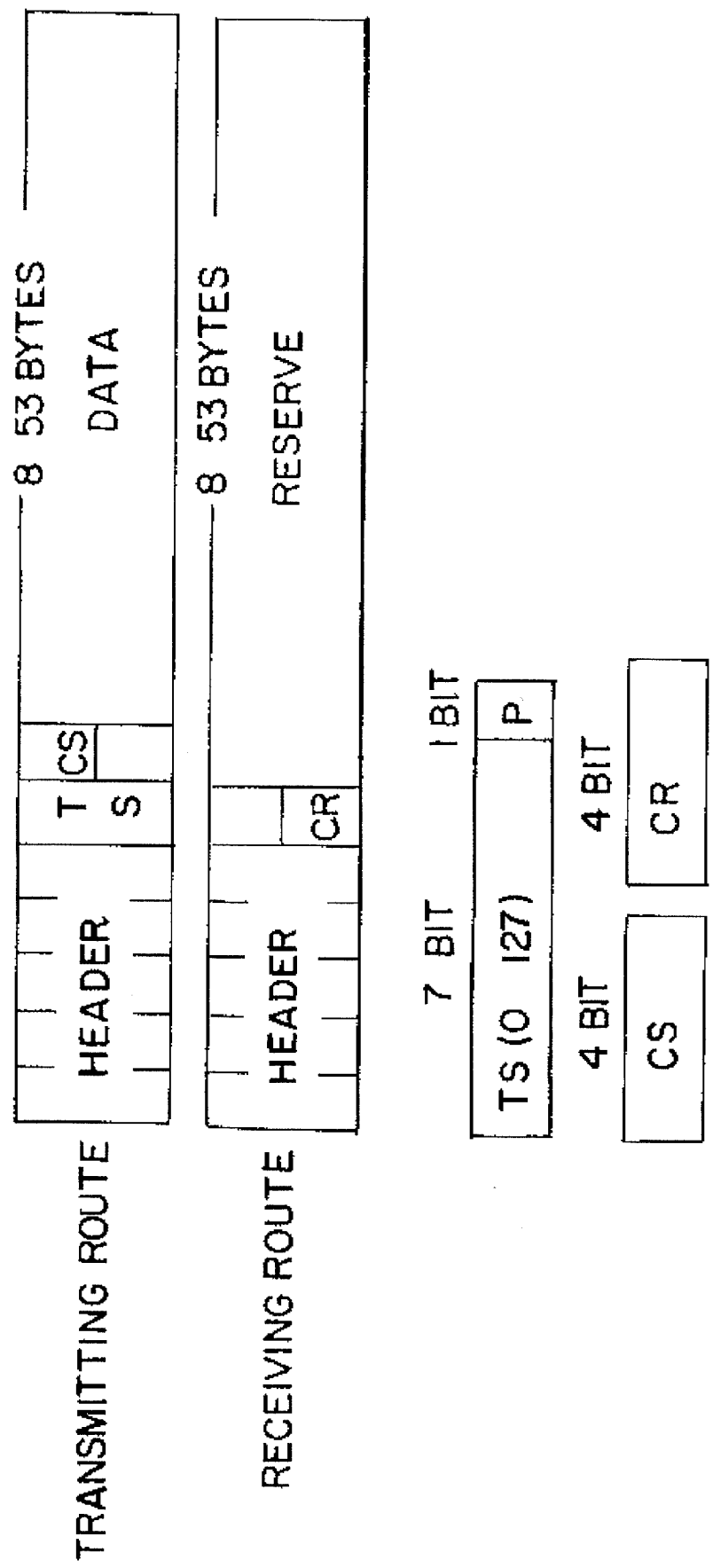
FIG. 12B shows the cell format used in the third embodiment.

An example of the cell format (53 byte cell length) is shown in FIG. 12B.

Time stamp TS is a count value of cells in a transmission order 0–127, P is a parity of TS, CS is a cell sending rate (0–15), and CR is a requested cell sending rate to the opposite terminal (0–15).

In the configuration shown in FIG. 12A, the transmitting direction of an image and voice is limited to one way and only the transmission rate of the transmitting line 1-1 of this ATM network 1 can be controlled similarly to that of the embodiment shown in FIG. 2A. The only difference between FIG. 2A and FIG. 12A is that in the receiving line 1-2 only a CR signal is required. Thus, different cell formats are yielded between the transmitting and receiving lines as shown in FIG. 12B. A cell in the receiving direction through returning line 1-2 is transmitted periodically at a constant appropriate rate.

In a similar example of the present embodiment, a cell on the receiving route can be a protocol communication cell for access to an exchanger, etc., where some bits are assigned to CR. If services for Dch users and user information are provided by the ATM network, a method of assigning CR to this communication cell can be realized.

According to the present invention, instead of using coder and decoder, a file for storing a lot of data including data other than video data or audio data may be used so that the data read out from the file is transmitted at a variable rate in accordance with the degree of cell discard, as is similar to the embodiment shown in FIG. 2A.

As described above, a discarded cell is detected by the receiving terminal which issues a request to decrease the cell transmission rate of the transmitting terminal. Therefore, the discarding operation caused due to a jam of cells can be mitigated on the transmission route, thus providing high quality transmission and an economical transmission area. The operation of the present invention assures its effect constantly as it covers variations of discard characteristics of the transmission circuit not limited to the circuit setup.

What is claimed is:

1. An asynchronous transfer mode (ATM) variable rate transmission system for performing two-way ATM transmission between a transmitting terminal and a receiving terminal through a transmission line, said system comprising:

a means for detecting cells discarded in data transmitting between said transmitting terminal and said receiving terminal, means for transmitting information of discarded cells detected by said receiving terminal to said transmitting terminal through a receiving line of said transmission line, said transmitting means controlling a number of transmitted cells according to a frequency of the occurrence of said discarded cells.

2. The ATM variable rate transmission system as set forth in claim 1, wherein the number of transmitted cells is decreased according to a frequency of the occurrence of discarded cells based on said discard cell information provided by said receiving terminal when the cell discard occurs more than predetermined times.

3. The ATM variable rate transmission system as set forth in claim 1, wherein the number of transmitted cells is decreased according to a frequency of the occurrence of discarded cells based on said discard cell information provided by said receiving terminal when the cell discard occurs less than predetermined times.

4. The ATM variable rate transmission system as set forth in claim 1, wherein the minimum and maximum values of the cell transmission rate can be determined to any value within a predetermined variable range.

5. An asynchronous transfer mode (ATM) variable rate transmission system for performing two-way ATM transmission between a transmitting terminal and a receiving terminal through a transmission line, said system comprising:

a means for detecting cells discarded in data transmitting between said transmitting terminal and said receiving terminal;

means for transmitting information of discarded cells detected by said receiving terminal to said transmitting terminal through a receiving line of said transmission line and controlling a number of transmitted cells according to a frequency of the occurrence of said discarded cells, wherein said cell discard detecting means comprises:
   a counter means for updating a count using a clock obtained from a cell sending rate and thereby producing a time stamp period signal,
   a buffer means for storing a time stamp and data according to a write clock, a time stamp comparing means connected to said buffer means for generating a discard indicating signal by comparing the time stamp period signal with said time stamp read from said buffer means, means for stopping a read clock of said buffer means when said discard indicating signal indicates the occurrence of a discard, and a controlling means for controlling a restart of the read clock by setting a no-discard signal provided by said discard detecting means to NO when said time stamp period signal reaches a value of said time stamp.

6. An ATM transmission unit according to claim 1, wherein a cell discard is detected and a cell transmission rate is controlled in a receiving route as well as in a transmission route, thereby forming two-way transmission system.

7. An ATM transmission system according to claim 1, wherein only a requested cell sending rate CR signal is provided in a receiving line, thereby forming one-way transmission system.

8. An ATM transmission system according to claim 1, and further comprising a coder receiving voice and images data, and means for determining a cell transmission rate, wherein the amount of data produced from the coder is increased or decreased according to the cell transmission rate whereby time-sequential information of voice and images are transmitted through the ATM transmission line.

9. An ATM system for transmitting cell information from a transmitting side to a receiving side through a two-way ATM transmission line, said system comprising:

a multiplexing means provided in said transmitting side for sending a cell comprising cell sending rate, requested cell sending rate discard, time stamp and data, to said receiving side through said ATM transmission line, a demultiplexing means provided in said receiving side for separating cells received from said two-way ATM transmission line, cell discard detecting means for detecting a discarded cell from the time stamp for defining the cell sending sequence, and generating discarded cell information, means for transmitting the requested cell sending rate determined based on the cell sending rate and discarded cell information, cell sending rate determining means for determining a cell sending rate and an encoding rate according to said requested cell sending rate received from said receiving side, and a variable rate encoder for encoding data to be sent to said multiplexing means according to said encoding rate.

10. An asynchronous transfer mode (ATM) transmission system for transmitting cell information from a transmitting side to a receiving side through a two-way ATM transmission line, said system comprising:

a demultiplexing means provided in said receiving side for isolating cells received from said two-way ATM transmission line, cell discard detecting means for detecting a discarded cell from a time stamp for defining a cell sending sequence, and generating discarded cell information, a multiplexing means provided in said transmitting side containing a cell of said discarded cell information, said time stamp and data, and sending said cell to said receiving side through said transmission line, encoding rate determining means for determining an encoding rate by said discarded cell information received from said receiving side, a variable rate encoder for encoding data to be sent to said multiplexing means according to said encoding rate, time series processing means for inserting a dummy cell into said discarded cell to absorb a time difference caused by said discarded cell when said cell discard detecting means detects a cell discarded from received data, and a variable rate decoder for decoding received data after adjusting said time difference.

11. A transmitting device for an asynchronous transfer mode (ATM) transmission system, comprising:

means for detecting cells discarded in a transmitting operation;

an encoding means for encoding an analog data signal to a digital data signal;

a multiplexing means for multiplexing digital data, a cell transmission rate, a requested cell transmission rate obtained from said detecting means according to a frequency of occurrence of cell discard, and a time stamp based on a cell format; and a transmitting means for transmitting multiplexed cells to an ATM transmission network according to a timing signal generated by said cell transmission rate which is determined based on said requested cell transmission rate.

12. A receiving device for an asynchronous transfer mode (ATM) transmission system, comprising:

a receiving means for receiving a cell;

a demultiplexing means for separating said cell into cell sending rate CS, a requested cell transmission sending rate CR, a time stamp TS, and data, according to a cell format of a received cell;

a buffer means for storing said time stamp TS and data according to a write clock;

a decoder for reading data from said buffer means and decoding said data by said cell sending rate CS; and a controlling means for generating said requested cell transmission rate CR to be sent to an opposite terminal based on the frequency of a cell discard detected by determining whether or not said time stamp TS read from said buffer means is a predetermined value.

* * * * *